INVENTORS.
DAN S. MATULICH
HAROLD S. SKINNER
ATTORNEY

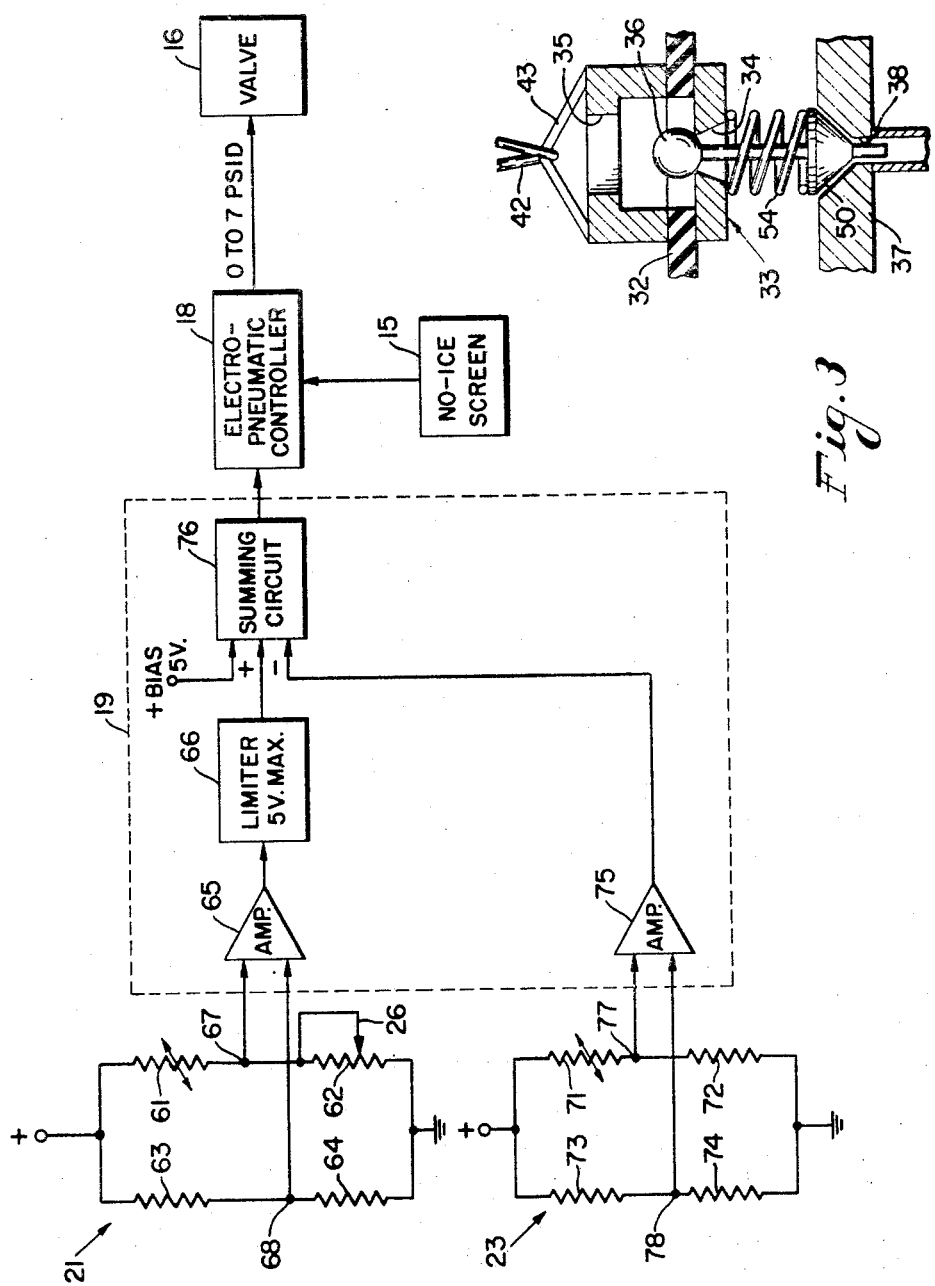

United States Patent Office 3,465,962
Patented Sept. 9, 1969

3,465,962
ELECTRO-PNEUMATICALLY CONTROLLED AIR CONDITIONING SYSTEM
Dan S. Matulich, Rolling Hill Estates, and Harold S. Skinner, Los Angeles, Calif., assignors to The Garrett Corporation, Los Angeles, Calif., a corporation of California
Filed Mar. 29, 1968, Ser. No. 717,141
Int. Cl. G05d 11/16, 23/28, 23/13
U.S. Cl. 236—13                                             8 Claims

ABSTRACT OF THE DISCLOSURE

An air conditioning system having an electro bleed valve controlled by an electrical current heating a resistor so that a pneumatic pressure is produced that is proportional to the electrical heating current. The pneumatic pressure is used to operate a valve to vary the flow ratio between a hot and cold air source. In addition, the valve is operated to increase the amount of hot air with respect to the amount of cold air in response to any pressure differential developed across an ice collection screen.

---

This invention relates to an air conditoning system having simplified controls which provide rapid and substantially accurate temperature responses.

An object of this invention is to provide an air conditioning system with a pneumatic valve having a simple, economical and reliable electro-pneumatic controller therein.

Another object of this invention is to provide a control circuit for the above-mentioned valve wherein the maximum temperature difference between selected and actual temperature is within a fixed range, for example, within three degrees Fahrenheit (3° F.).

The manner of accomplishing the foregoing objects and other objects and features of the invention will become apparent from the following detailed description of an illustrative embodiment thereof, reference being made to the accompanying drawings wherein:

FIG. 2 is a block diagram showing the control commands between the components show in FIG. 1; and FIG. 3 is an enlarged fragment of the electro-pneumatic controller.

Figure 1:
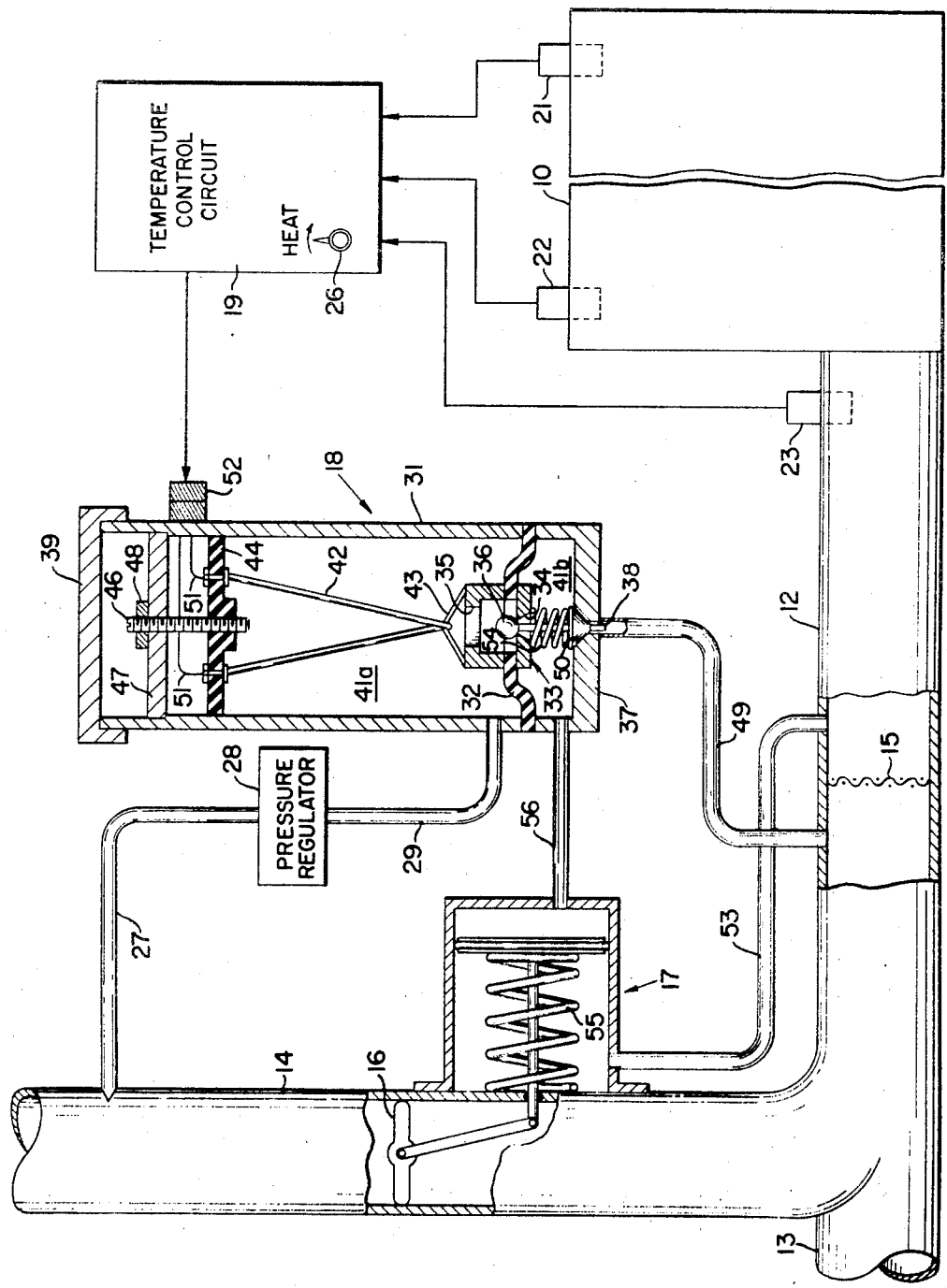
FIG. 1 illustrates a schematic of one embodiment of the improved air conditioning system having an electro-pneumatic pressure controller.

Referring to the drawing, and to FIG. 1 in particular, there is shown an air conditioning system as encountered, for example, on aircrafts wherein the temperature of an aircraft cabin 10 is to be controlled. Fresh air is supplied to the cabin 10 through a duct 12 which has an icing screen 15 and communicates with a cold air duct 13 and a hot air duct 14. Normally on aircrafts, cold air is supplied to duct 13 by the air refrigeration system, and the hot air, supplied to duct 14, is the turbine bleed air. The hot air, being at a relatively higher pressure than the cold air, is restricted by a butterfly valve 16 disposed within duct 14 to modulate the flow of hot air. The valve 16 is controlled by a pneumatic piston and cylinder assembly 17, whose piston is suitably linked to the valve 16. The pressure of the fluid supplied to assembly 17 is controlled by an electro-pneumatic pressure controller or regulator 18 that responds to a signal supplied by a temperature control circuit 19. In turn, the signal supplied by a temperature control circuit 19 is determined by the temperature within the aircraft cabin 10 as sensed by one or more temperature sensors 21 and 22 and the temperature of the supply air in duct 12 as sensed by another temperature sensor 23. A knob 26 is conveniently provided, preferably on control circuit 19, to select the desired cabin temperature. In an aircraft, the control circuit 19 would most likely be located in cabin 10. The power for operating the piston and cylinder assembly 17 is supplied by, for example, the air in duct 14. A tube 27 couples the source of the air in duct 14 to a standard pressure regulator 28 so that the air entering the regulator 18 is at constant pressure for reasons that will become apparent hereinafter. The constant pressure air is fed to the regulator 18 through to tube 29. The regulator 18 has a cylindrical body 31 with a flexible rubber diaphragm 32 disposed near one end thereof. The diaphragm 32 has a central aperture in which is bonded a valve port assembly 33 having two ports 34 and 35. Through the port 34 passes the stem of a ball valve 36. At the other end of the stem is a conical valve 50 which seats into a suitably shaped port 38 formed in a plate 37 closing one end of body 31. A compression spring 54 is suitably provided to cause the ball 36 to seat against port 34 whenever port 38 is open. A tube 49 is attached to port 38 so that the compartment 41b communicates with duct 12 at the upstream side of the screen 15. Compartment 41b also communicates with the head end of piston assembly 17 through a tube 56 so that the pressure within compartment 41b is applied to the head end of the piston. The crank end of the piston communicates with duct 12 at a point downstream of the screen 15 through a tube 53.

The other end of the body 31 is sealed by a cap 39 providing a substantially airtight compartment which is divided by diaphragm 32 into compartments 41a and 41b. The regulated air supplied by pressure regulator 28 is supplied to compartment 41a. Since the air pressure in compartment 41a tends to open port 34, the movement of diaphragm 32 is restrained by a wire 42. The ends or wire 42 are fixed to an electric insulator 44 and the bight portion thereof engages a suitable eyelet 43 fixed to the valve port assembly 33. The ends of the wire 42 are restrained from moving because the insulator 44 is held by threaded element 46 that, in turn, passes through a hole in a transverse wall 47 which is suitably fixed to body 31. The element 46 has a nut 48 threaded on the other end so that the tension of wire 42 can be easily adjusted by simply turning the nut 48. The tension of wire 42 is set so that port 38 is slightly open (as shown in FIG. 3) when wire 42 is at a given low temperature, causing the compartment 41b to be at ambient pressure. The ends of wire 42 are coupled by suitable leads 51 (schematically shown) to an external electric plug 52 so that the length of the wire may be controlled by an electric current. The wire 42 being metallic is chosen for its resistivity and coefficient of thermal expansion, i.e., the length of the wire increases proportionally with temperature when heated by an electric current passing therethrough.

Since the pressure in compartment 41b is coupled to the piston assembly 17 through tube 52, the position of valve 16 is related to this pressure and, in turn, the pressure is related to the current in the following manner. When the temperature of the wire 42 is below the given low value, the difference between pressures in compartments 41a and 41b is greatest, causing the wire to stretch due to the pressure difference. However, the length of the wire is such that port 34 is closed while port 38 is open. Since compartment 41b is at ambient pressure, and since there is no ice accumulated on the screen 15, the pressure on both sides of the piston in assembly 17 is the same so that valve 16 is closed due to the action of spring 55. When more current flows through the wire 42, it is heated an amount related to the current and elongates causing the cone 50 to bear against port 38. In turn the port 34 is opened. The pressure in compartment 41b builds up rapidly. As the difference in pressure across the diaphragm diminishes, the tension in the wire 42 decreases causing wire 42 to shrink until port 34 closes, but port 38 does not open. The pressure in compartment 41b is now larger than ambient (the pressure in duct 12), so that compression spring 55 is partially overcome and the piston moves to the left until the spring 55 is compressed sufficiently to balance the piston force. Valve 16 opens as the spring 55 is compressed. Thus, if wire 42 is made hotter, the wire elongates further, again port 34 opens to allow the pressure in compartment 41b to further increase, as before port 34 closes when the pressure differential across the diaphragm decreases. In turn, the piston moves further to the right to further open the valve 16. When wire 42 is heated above a predetermined high value, the forces are such that port 34 remains open when the pressure differential across the diaphragm is zero. At the same time port 38 is closed. Thus valve 16 is fully open to allow the maximum flow of hot air to mix with the cold air. To decrease the temperature of the air, the current to the wire is decreased. Then port 38 opens to lower the pressure in compartment 41b. When this pressure is equal to the value corresponding to the electric current, port 38 closes.

Referring to FIG. 2, a block diagram is shown of the temperature control circuit 19, which controls the value of the current. There is also shown one of the cabin temperature sensors, for example, sensor 21 and the temperature sensor 23. Each sensor is comprised of a bridge circuit wherein the bridge circuit for sensor 21 has resistors 61 and 62 connected in series and has resistors 63 and 64 also connected in series. The other bridge circuit for sensor 23 has series resistors 71 and 72 and series resistors 73 and 74. Resistors 62, 63, 64, 72, 73 and 74 have resistance values that do not change substantially with temperature while the resistance of resistors 61 and 71 vary with temperature. The bridges are connected across a suitable power supply as shown so that the temperature sensitive resistors are connected to the positive terminal as shown in the drawing. Resistor 62 is adjustable and is controlled by the knob 26.

Junctions 67 and 68 of resistors 61 and 62 and of resistors 63 and 64, respectively, are connected to the temperature controller 19 and, in particular, to an amplifier 65, a part thereof which amplifies the voltage difference between the two junctions and produces a positive voltage when the potential of junction 67 is higher than junction 68. The amplified signal is fed to a limiter 66 whose output voltage varies directly with the input voltage up to a maximum value. In addition, the voltage difference between the junction 77 and 78 of resistors 71 and 72 and of resistors 73 and 74, respectively, are also coupled to the controller circuit 19 and, in particular, to another amplifier 75 which is a part thereof. Like amplifier 65, amplifier 75 produces a positive voltage when the potential of junction 77 is higher than junction 78. The outputs of amplifier 75 and limiter 66 are coupled to a summing circuit together with a biasing voltage so that the output voltage of the summing circuit is a sum of the voltages applied to the inputs.

Variable resistors 61 and 71 have the characteristic that their resistance varies with temperature so that when the temperature in the cabin 10 falls below the selected temperature, the potential of the junction 67 becomes higher than the potential of junction 68. The ratio of temperature difference to voltage difference is, for example, 3° F. per 100 millivolts (mv.). The amplifier 65 amplifies this voltage input by, for example, a factor of 50 so that, when the cabin temperature drops 3° F. and the potential of junction 67 is 100 mv. above the potential of junction 68, plus five volts is outputted by the amplifier 65. For reasons that will be explained hereinafter, the limiter limits the amplified voltage to, for example, plus 5 volts. Thus the limiter 66 produces a voltage that is 5 v. or lower and above 0 v. since, during normal operation, the cabin temperature seldom exceeds selected temperature. The output of amplifier 75 could be any value from 0 v. to minus 5 v. and the summing circuit adds the output voltages of the limiter 66 and amplifier 75 to the bias voltage of 5 volts and couples the voltage (which is between 5–10 v.) to the electro-pneumatic controller 18 causing the wire 42 to become proportionately hotter. The characteristics of the controller 18 are that, when 5 v. is applied to wire 42, port 34 is closed and port 38 is slightly open and, when 10 v. is applied, port 34 is slightly open and port 38 is closed.

Now that valve 16 is open, hot air is passing through duct 12 towards the cabin 10. To prevent excess temperature surges in the cabin, the function of the temperature sensor 23 is to close the valve 16 before the cabin becomes too hot. This is accomplished when the hot gases cause the resistances of resistor 71 to rise whereby the potential of junction 77 drops below junction 78. The ratio of temperature rise in the duct 12 to the voltage difference produced is, for example, 30° F. per 100 mv. and produces a potential difference of 500 mv. when the temperature in duct 12 is, for example, 150° F. The amplifier 75 has, for example, a gain of ten. Thereby producing a negative output voltage that has a value of minus 1 v. for every 30° F. temperature rise in the duct. This negative voltage, being coupled to the summing circuit, lowers the output voltage thereof causing the valve 16 to close. Thus, whenever the air temperature in the duct 12 reaches 150° F. the valve 16 is fully closed because no more than 5 v. could be coupled to the controller 18. Excessive temperature in the duct 12 is thereby prevented. If the duct is designed to withstand higher or lower temperatures, the components of the sensor 23 or the amplifier 76 would be changed so that minus 5 v. is produced when the duct is at the higher or lower temperature. Now, if the temperature in the cabin is above the selected temperature the amplifier 65 produces a negative voltage which, when added to the biasing 5 v. voltage in circuit 76, causes the output of the summing circuit 76 to drop below 5 v. Since the valve 16 only opens when more than 5 v. is applied to the controller, any voltage below 5 v. would not open the valve.

Referring again to FIG. 1, the air conditioning system should not ice up since its effectiveness would diminish. The function of the screen 15 is to detect when icing conditions are prevalent within the duct 12. When icing conditions are prevalent, ice would form on the screen 15 causing a pressure differential thereacross whereby the pressure on the upstream side rises above the pressure on the downstream side. Tube 49 communicates the rising pressure to the head end of the piston assembly 17. Since the crank end is at a lower pressure, valve 16 opens when ice forms on the screen 15. This causes warm air to enter the duct 12. When sufficient warm air is supplied the ice melts and the pressure differential across the screen becomes zero. Thus, the temperature of the air in duct 12 is prevented from dropping below the dew point when the system is trying to cool the cabin during hot humid days.

In the light of the teachings, various modifications and variations of the present invention are contemplated and will be apparent to those skilled in the art without departing from the spirit and scope of the invention. Therefore, the invention is not limited to the exemplary apparatus or procedure described, but includes all embodiments within the scope of the claims.

What is claimed is:
1. An air conditioning system comprising:
   a source of cool air;
   a source of warm air;
   first means for combining the cool and warm air;
   second means for sensing the temperature of the combined air and producing a signal when the temperature thereof is different from a selected temperature;
   a screen disposed within said first means so that the combined air flows through said screen;
   a valve disposed to control the flow of at least one of said sources of air;
   a controller for producing a fluid pressure in response to said signal;

third means having a movable member that moves in response to said fluid pressure;

fourth means for mechanically coupling said movable member to said valve so that the opening of said valve varies when said movable member moves;

fifth means coupling the air pressure produced on the upstream side of said screen to one side of said movable member and for coupling the air pressure produced on the downstream side of said screen to the other side of said movable member to cause said movable member to move when the air pressures are not equal to, in turn, move said valve to cause more warm air to be added to the combined air.

2. The system of claim 1 wherein:

said signal has an amplitude related to the difference between the temperature of the combined air and the selected temperature; and said fluid pressure is proportional to the amplitude of said signal.

3. The system of claim 2 wherein:

said controller includes:

a housing having an air inlet port and air outlet orifice, said inlet port being adapted to receive air having a pressure higher than ambient, a diaphragm disposed between said inlet port and said outlet orifice, said diaphragm having an aperture, a member disposed near said aperture so that the effecting opening of said aperture changes whenever the diaphragm moves relative to said member, a wire having the property of being resistively heated and of expanding when an electric current passes therethrough, said wire being disposed within said housing to restrain the movement of said diaphragm due to the force of the air pressure, and said signal is an electric current which heats said wire so that the length of wire increases and, in turn, the effective opening of said aperture changes producing said fluid pressure.

4. The system of claim 2 wherein:

means is provided for supplying the combined air to an enclosure in which the temperature and pressure are to be controlled;

said warm air is at a higher pressure than the cool air.

5. The system of claim 4 wherein:

said means for sensing temperature includes:

a first temperature sensor disposed to sense the temperature of the mixture before entering said enclosure, to produce a first signal in response thereto, and a second temperature sensor disposed to sense the temperature within said enclosure to produce a second signal in response thereto, and means for comparing the value of said first and second signals and producing said command signal as a result of the comparison.

6. The system of claim 3 wherein:

a duct is provided for ducting the combined air to an enclosure in which the temperature and pressure are to be controlled, said screen is disposed within said duct to trap any ice that may form therein, and said fifth means includes a tube to communicate said outlet orifice with said duct on the upstream side of said screen.

7. The system of claim 6 wherein said movable member is a piston sliding in a cylinder, said piston is movable within said cylinder by said fluid pressure, said fifth means further includes a tube for applying said fluid pressure to one side of said piston and a tube for applying the pressure in the downstream side of said screen to the other side of said piston to cause the piston to move a distance proportional to the difference in pressures applied thereacross, and, the size of the opening formed by said valve is related to the position of said piston within said cylinder.

8. A controller including:

a housing having an air inlet port and air outlet orifice, said inlet port being adapted to receive air having a pressure higher than an exhaust pressure, a diaphragm disposed between said inlet port and said outlet orifice, said diaphragm having an aperture, a member disposed near said aperture so that the effecting opening of said aperture changes whenever the diaphragm moves relative to said member, a wire having the property of being resistively heated and of expanding when an electric current passes therethrough, said wire being disposed within said housing to restrain the movement of said diaphragm due to the force of the air pressure, and said signal is an electric current which heats said wire so that the length of wire increases and, in turn, the effective opening of said aperture changes producing said fluid pressure.

References Cited

UNITED STATES PATENTS

| 2,752,891 | 7/1956 | Farkas | 165—36 X |
| 2,789,543 | 4/1957 | Popowsky. | |
| 3,239,189 | 3/1966 | Ray | 236—68 X |
| 3,315,730 | 4/1967 | Weaver et al. | 165—23 |

WILLIAM E. WAYNER, Primary Examiner

U.S. Cl. X.R.

165—31; 236—80, 85; 251—11